US008464426B2

(12) United States Patent
Kirchner et al.

(10) Patent No.: US 8,464,426 B2
(45) Date of Patent: Jun. 18, 2013

(54) GAS TURBINE ENGINE AIRFOIL

(75) Inventors: Jody Kirchner, Chicago, IL (US); Yuan Dong, Glastonbury, CT (US); Sanjay S. Hingorani, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/437,040

(22) Filed: Apr. 2, 2012

(65) Prior Publication Data

US 2012/0192421 A1 Aug. 2, 2012

Related U.S. Application Data

(62) Division of application No. 12/336,610, filed on Dec. 17, 2008, now Pat. No. 8,167,567.

(51) Int. Cl.
*B21D 53/78* (2006.01)
*B21K 3/04* (2006.01)
*B23P 15/02* (2006.01)

(52) U.S. Cl.
USPC .................... 29/889.71; 416/223 R; 416/238; 416/242; 416/243

(58) Field of Classification Search
USPC .................. 29/889.71; 416/223 R, 238, 242, 416/243, DIG. 2, DIG. 5
See application file for complete search history.

(56) References Cited

U.S. PATENT DOCUMENTS

| | | | |
|---|---|---|---|
| 4,880,355 | A | 11/1989 | Vuillet et al. |
| 4,979,698 | A | 12/1990 | Lederman |
| 5,088,892 | A | 2/1992 | Weingold et al. |
| 5,137,427 | A | 8/1992 | Shenoy |
| 5,199,851 | A | 4/1993 | Perry et al. |
| 5,332,362 | A | 7/1994 | Toulmay et al. |
| 5,393,199 | A | 2/1995 | Alizadeh |
| 5,685,696 | A | 11/1997 | Zangeneh et al. |
| 5,730,583 | A | 3/1998 | Alizadeh |
| 5,992,793 | A | 11/1999 | Perry et al. |
| 6,071,077 | A | 6/2000 | Rowlands |
| 6,331,100 | B1 | 12/2001 | Liu et al. |
| 6,368,061 | B1 | 4/2002 | Capdevila |
| 6,899,526 | B2 | 5/2005 | Doloresco et al. |
| 6,901,873 | B1 | 6/2005 | Lang et al. |
| 6,976,829 | B2 | 12/2005 | Kovalsky et al. |
| 7,207,526 | B2 | 4/2007 | McCarthy |
| 7,246,998 | B2 | 7/2007 | Kovalsky et al. |
| 7,252,479 | B2 | 8/2007 | Bagai et al. |
| 7,264,200 | B2 | 9/2007 | Bussom et al. |
| 7,967,571 | B2 | 6/2011 | Wood et al. |

FOREIGN PATENT DOCUMENTS

WO 2009103528 A2 8/2009

OTHER PUBLICATIONS

Extended European Search Report for Application No. EP 09 25 2818 dated Oct. 22, 2012.

*Primary Examiner* — Michelle Mandala

(74) *Attorney, Agent, or Firm* — Carlson, Gaskey & Olds PC

(57) ABSTRACT

A method of designing an airfoil for a gas turbine engine according to one embodiment of this disclosure can include localizing a sweep angle at a leading edge of a tip region of the airfoil, and localizing a dihedral angle at the tip region of the airfoil. The dihedral angle can be applied by translating the airfoil in direction normal to a chord of the airfoil.

7 Claims, 3 Drawing Sheets

GAS TURBINE ENGINE AIRFOIL

CROSS REFERENCE TO RELATED APPLICATIONS

This application is a divisional application of U.S. patent application Ser. No. 12/336,610, filed Dec. 17, 2008 now U.S. Pat. No. 8,167,567.

BACKGROUND

This disclosure generally relates to a gas turbine engine, and more particularly to rotor blades that improve gas turbine engine performance.

Gas turbine engines, such as turbofan gas turbine engines, typically include a fan section, a compressor section, a combustor section and a turbine section. During operation, air is pressurized in the compressor section and mixed with fuel in the combustor section for generating hot combustion gases. The hot combustion gases flow through the turbine section which extracts energy from the hot combustion gases to power the compressor section and drive the fan section.

Many gas turbine engines include axial-flow type compressor sections in which the flow of compressed air is parallel to the engine centerline axis. Axial-flow compressors utilize multiple stages to obtain the pressure levels needed to achieve desired thermodynamic cycle goals. A typical compressor stage consists of a row of moving airfoils (called rotor blades) and a row of stationary airfoils (called stator vanes). The flow path of the axial-flow compressor section decreases in cross-sectional area in the direction of flow to reduce the volume of air as compression progresses through the compressor section. That is, each subsequent stage of the axial flow compressor decreases in size to maximize the performance of the compressor section.

One design feature of an axial-flow compressor section that may affect compressor performance is tip clearance flow. A small gap extends between the tip of each rotor blade and a surrounding shroud in each compressor stage. Tip clearance flow is defined as the amount of airflow that escapes between the tip of the rotor blade and the adjacent shroud. Tip clearance flow reduces the ability of the compressor section to sustain pressure rise and may have a negative impact on stall margin (i.e., the point at which the compressor section can no longer sustain an increase in pressure such that the gas turbine engine stalls).

Airflow escaping through the gaps between the rotor blades and the shroud can create gas turbine engine performance losses. In the middle and rear stages of the compressor section, blade performance and operability of the gas turbine engine are highly sensitive to the lower spans (i.e., decreased size) of the rotor blades and the corresponding high clearance to span ratios. Disadvantageously, prior rotor blade airfoil designs have not adequately alleviated the negative effects caused by tip clearance flow.

SUMMARY

A method of designing an airfoil for a gas turbine engine according to one embodiment of this disclosure can include localizing a sweep angle at a leading edge of a tip region of the airfoil, and localizing a dihedral angle at the tip region of the airfoil. The dihedral angle can be applied by translating the airfoil in direction normal to a chord of the airfoil.

In a further embodiment of the foregoing method embodiment, the sweep angle can include a forward sweep angle.

In a further embodiment of either of the foregoing method embodiments, the step of localizing the sweep angle can include displacing a plurality of airfoil sections of the airfoil parallel to the chord relative to a base-line rotor blade design.

In a further embodiment of any of the foregoing method embodiments, the dihedral angle can include a positive dihedral angle.

In a further embodiment of any of the foregoing method embodiments, the step of localizing the dihedral angle can include displacing a plurality of airfoil sections of the airfoil tangentially to the chord relative to a base-line rotor blade design.

In a further embodiment of any of the foregoing method embodiments, the sweep angle and the dihedral angle can be extended over a distance of the airfoil equivalent to about 10% to about 40% of a span of the airfoil.

In a further embodiment of any of the foregoing method embodiments, the sweep angle and the dihedral angle can be extended from an outer edge of the tip region radially inward along a radial axis over a distance equal to about 10% to about 40% of the span.

The various features and advantages of this disclosure will become apparent to those skilled in the art from the following detailed description. The drawings that accompany the detailed description can be briefly described as follows.

DETAILED DESCRIPTION

Figure 1:
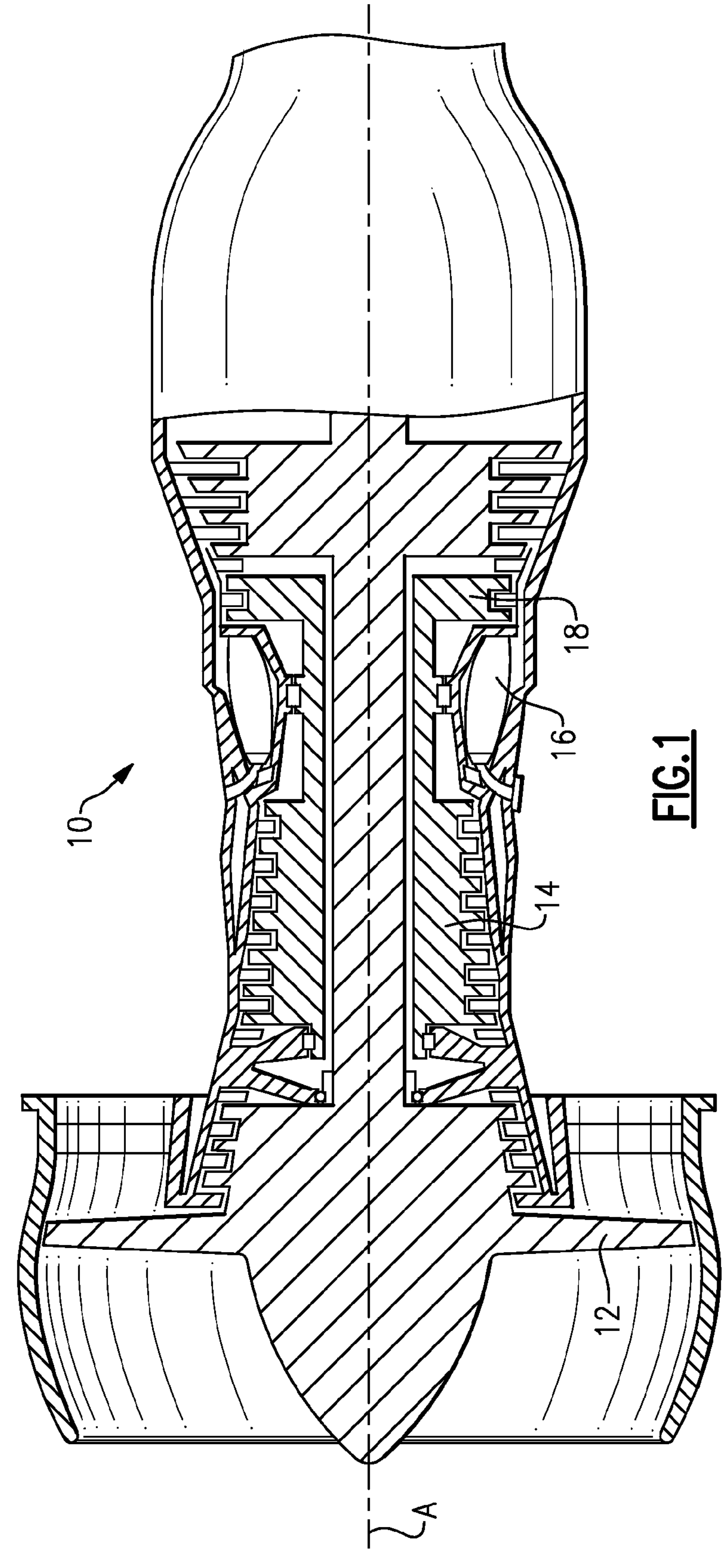
FIG. 1 is a cross-sectional view of an example gas turbine engine.

FIG. 1 illustrates an example gas turbine engine 10 that includes a fan 12, a compressor section 14, a combustor section 16 and a turbine section 18. The gas turbine engine 10 is defined about an engine centerline axis A about which the various engine sections rotate. As is known, air is drawn into the gas turbine engine 10 by the fan 12 and flows through the compressor section 14 to pressurize the airflow. Fuel is mixed with the pressurized air and combusted within the combustor 16. The combustion gases are discharged through the turbine section 18 which extracts energy therefrom for powering the compressor section 14 and the fan 12. Of course, this view is highly schematic. In one example, the gas turbine engine 10 is a turbofan gas turbine engine. It should be understood, however, that the features and illustrations presented within this disclosure are not limited to a turbofan gas turbine engine. That is, the present disclosure is applicable to any engine architecture.

Figure 2:
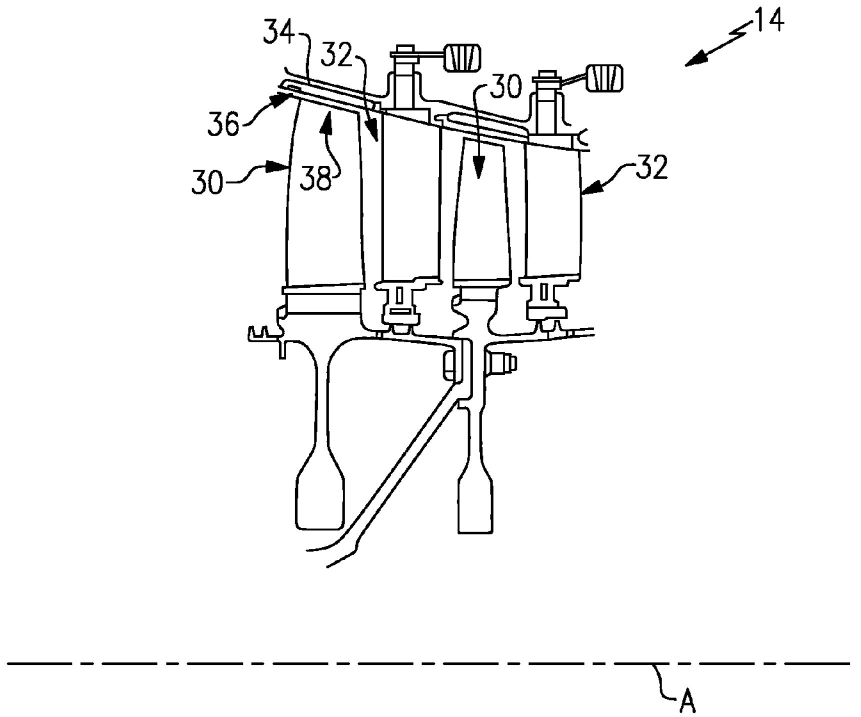
FIG. 2 illustrates a portion of a compressor section of the example gas turbine engine illustrated in FIG. 1.

FIG. 2 schematically illustrates a portion of the compressor section 14 of the gas turbine engine 10. In one example, the compressor section 14 is an axial-flow compressor. Compressor section 14 includes a plurality of compression stages including alternating rows of rotor blades 30 and stator blades 32. The rotor blades 30 rotate about the engine centerline axis A in a known manner to increase the velocity and pressure level of the airflow communicated through the compressor section 14. The stationary stator blades 32 convert the velocity of the airflow into pressure, and turn the airflow in a desired direction to prepare the airflow for the next set of rotor blades 30. The rotor blades 30 are partially housed by a shroud assembly 34 (i.e., outer case). A gap 36 extends between a tip region 38 of each rotor blade 30 to provide clearance for the rotating rotor blades 30.

Figure 3:
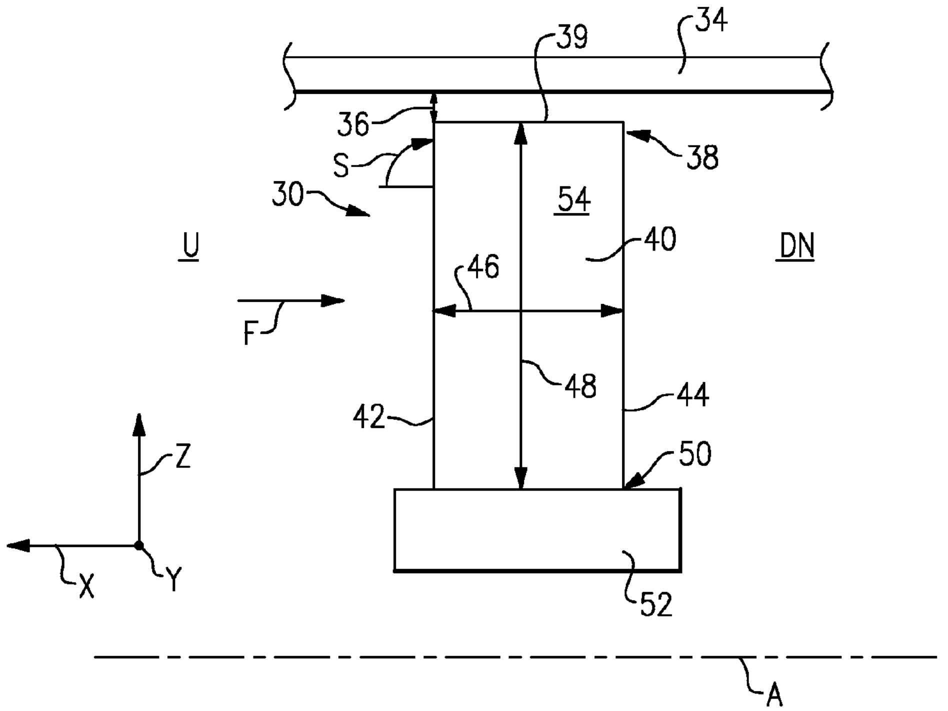
FIG. 3 illustrates a schematic view of a rotor blade according to the present disclosure.
Figure 4:
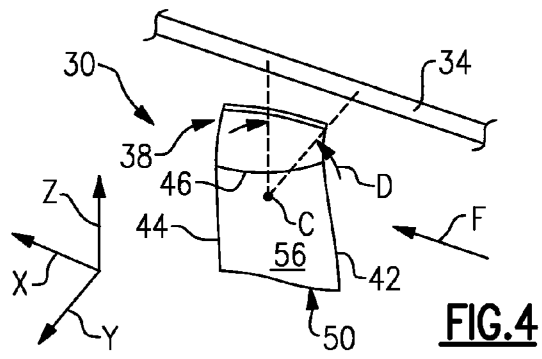
FIG. 4 illustrates another view of the example rotor blade illustrated in FIG. 3.

FIGS. 3 and 4 illustrate an example rotor blade 30 that includes unique design elements localized at tip region 38 for reducing the detrimental effect of tip clearance flow. Tip clearance flow is defined as the amount of airflow that escapes through the gap 36 between the tip region 38 of the rotor blade 30 and the shroud assembly 34. The rotor blade 30 includes an airfoil 40 having a leading edge 42 and a trailing edge 44. A chord 46 of the airfoil 40 extends between the leading edge 42 and the trailing edge 44. A span 48 of the airfoil 40 extends between a root 50 and the tip region 38 of the rotor blade 30. The root 50 of the rotor blade 30 is adjacent to a platform 52 that connects the rotor blade 30 to a rotating drum or disk (not shown) in a known manner.

The airfoil 40 of the rotor blade 30 also includes a suction surface 54 and an opposite pressure surface 56. The suction surface 54 is a generally convex surface and the pressure surface 56 is a generally concave surface. The suction surface 54 and the pressure surface 56 are designed conventionally to pressurize the airflow as airflow F is communicated from an upstream direction U to a downstream direction DN. The airflow F flows in an axial direction X that is parallel to the longitudinal centerline axis A of the gas turbine engine A. The rotor blade 30 rotates in a rotational direction (circumferential) Y about the engine centerline axis A. The span 48 of the airfoil 40 is positioned along a radial axis Z of the rotor blade 30.

The example rotor blade 30 includes a sweep angle S (See FIG. 3) and a dihedral angle D (See FIG. 4) that are each localized relative to the tip region 38 of the rotor blade 30. The term "localized" as utilized in this disclosure is intended to define the sweep angle S and the dihedral angle D at a specific portion of the airfoil 40, as is further discussed below. Although the sweep angle S and the dihedral angle D are disclosed herein with respect to a rotor blade, it should be understood that other components of the gas turbine engine 10 may benefit from similar aerodynamic improvements as those illustrated with respect to the rotor blade 30.

Figure 5:
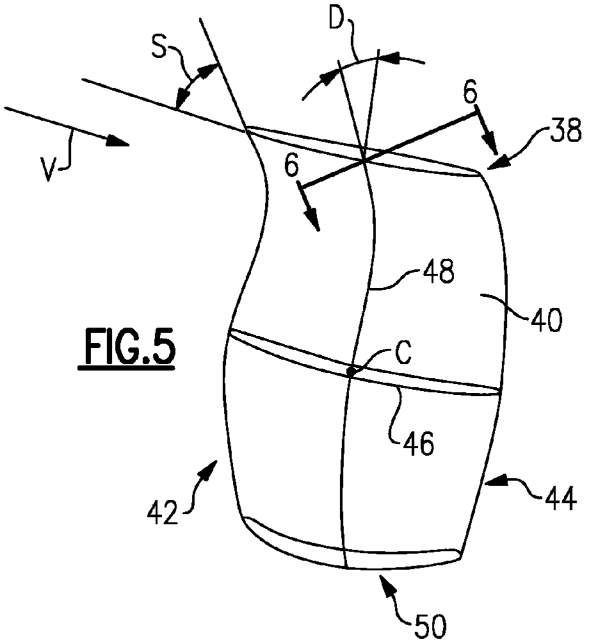
FIG. 5 illustrates an airfoil designed having a sweep angle S and a dihedral angle D.

Referring to FIG. 5, the sweep angle S, at a given radial location, is defined as the angle between the velocity vector V of incoming flow relative to the airfoil 40 and a line tangent to the leading edge 42 of the airfoil 40. In one example, the sweep angle S is a forward sweep angle. Forward sweep usually involves translating an airfoil section at a higher radius forward (opposite to incoming airflow) along the direction of the chord 46.

Figure 6:
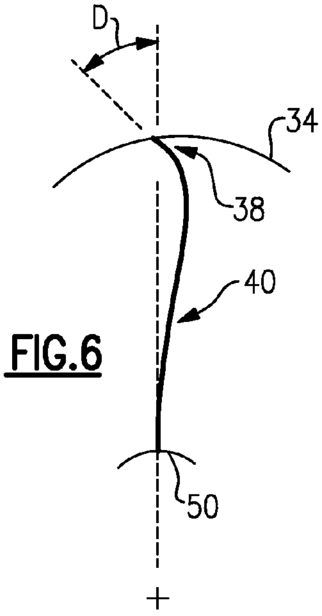
FIG. 6 illustrates a sectional view through section 6-6 of FIG. 5.

As illustrated in FIGS. 4, 5 and 6, the dihedral angle D is defined as the angle between the shroud assembly 34 and the airfoil 40. In this example, the dihedral in the tip region 38 of the airfoil 40 is controlled by translating the airfoil 40 in a direction perpendicular to the chord 46. A measure of the dihedral angle D is performed at the center of gravity C of the airfoil 40. In one example, the dihedral angle D is a positive dihedral angle. Positive dihedral increases the angle between the suction surface 54 of the airfoil 40 and an interior surface 58 of the shroud assembly 34. That is, positive dihedral angle results in the suction surface 54 pointing down relative to the shroud assembly 34. In another example, the suction surface 54 forms an acute dihedral angle D relative to the shroud assembly 34.

Figure 7:
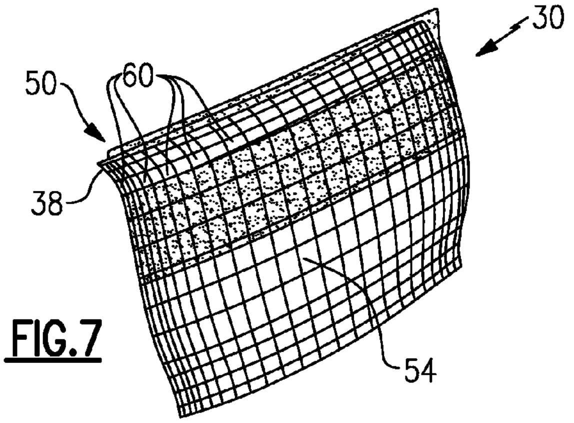
FIG. 7 illustrates yet another view of the example rotor blade having a redesigned tip region merged relative to a base-line design of the rotor blade.
Figure 8:
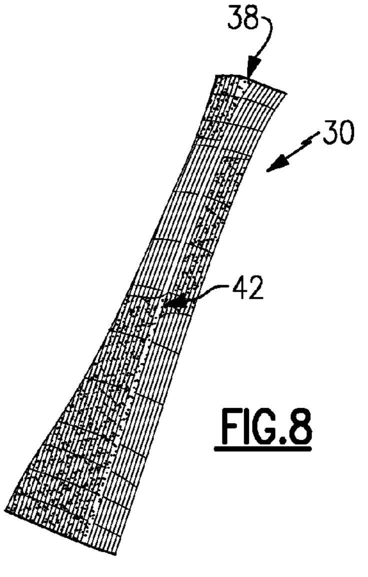
FIG. 8 illustrates another view of the rotor blade illustrated in FIG. 5 as viewed from a leading edge of the rotor blade.

The amount of sweep S and dihedral D included on the rotor blade 30 is defined at the tip region 38 of the rotor blade 30 and merged back to a baseline geometry (see FIGS. 7 and 8). In one example, the sweep angle S and the dihedral angle D extend over a distance of the airfoil 40 that is equivalent to about 10% to about 40% of the span 48 of the rotor blade 30. That is, the sweep S and dihedral D are positioned at a distance from an outer edge 39 of the tip region 38 radially inward along radial axis Z by about 10% to about 40% of the total span 48 of the airfoil 40. The term "about" as utilized in this disclosure is defined to include general variations in tolerances as would be understood by a person of ordinary skill in the art having the benefit of this disclosure.

FIGS. 7 and 8 illustrate the example rotor blade 30 superimposed over a base-line design rotor blade (shown in shaded portions). The base-line design rotor blade represents a blade having sweep and dihedral as a result of stacking airfoil sections in a conventional way. A conventional stacking is such that the center of gravity of airfoil sections are close to being radial with offset as a result of minimizing stress caused by centrifugal force acting on the airfoil when the rotor is rotating. In the illustrated example, a plurality of airfoil sections 60 of the rotor blade are tangentially and axially restacked relative to the base-line design rotor blade to provide tip region 38 localized forward sweep S and positive dihedral D, for example. The amount of sweep S and dihedral D and the corresponding tangential and axial offsets are defined at the tip region 38 and merged back to the base-line design rotor blade over a distance equivalent to about 10% to about 40% of the span 48 of the rotor blade 30, in one example.

Providing localized sweep S and dihedral D at the tip region 38 of the rotor blade 30 results in airflow being pulled toward the tip region 38 relative to a conventional rotor blade without the sweep and dihedral described above. This reduces the diffusion rate of local flow, which tends to have a lower axial component and is prone to flow reversal. Simulation using Computational Fluid Dynamics (CFD) analysis demonstrates that an airfoil with local sweep and dihedral reduces the entropy generated by the tip clearance flow. At the same time, tip clearance flow through the gaps 36 is reduced. Therefore, the radial distributions of blade exit velocity and stagnation pressure are improved, thus maintaining higher momentum in the region of the tip region 38. The negative effects of stall margin are minimized and gas turbine engine performance and efficiency are improved.

The foregoing description shall be interpreted as illustrative and not in any limiting sense. A person of ordinary skill in the art would understand that certain modifications would come within the scope of this disclosure. For that reason, the following claims should be studied to determine the true scope and content of the disclosure.

What is claimed is:

1. A method of designing an airfoil for a gas turbine engine, comprising the steps of:

a) localizing a sweep angle at a leading edge of a tip region of the airfoil; and b) localizing a dihedral angle at the tip region of the airfoil, wherein the dihedral angle is applied by translating the airfoil in direction normal to a chord of the airfoil.

2. The method as recited in claim 1, wherein the sweep angle is a forward sweep angle.

3. The method as recited in claim 1, wherein said step a) includes the step of:

displacing a plurality of airfoil sections of the airfoil parallel to the chord relative to a base-line rotor blade design.

4. The method as recited in claim 1, wherein the dihedral angle is a positive dihedral angle.

5. The method as recited in claim 1, wherein said step b) includes the step of:

displacing a plurality of airfoil sections of the airfoil tangentially to the chord relative to a base-line rotor blade design.

6. The method as recited in claim 1, comprising the step of:

c) extending the sweep angle and the dihedral angle over a distance of the airfoil equivalent to about 10% to about 40% of a span of the airfoil.

7. The method as recited in claim 6, wherein said step c) includes the step of:

extending the sweep angle and the dihedral angle from an outer edge of the tip region radially inward along a radial axis over a distance equal to about 10% to about 40% of the span.

* * * * *